(12) United States Patent
Hackman

(10) Patent No.: US 7,462,143 B2
(45) Date of Patent: Dec. 9, 2008

(54) MACHINE SPINDLE

(75) Inventor: Roger L. Hackman, Winnebago, IL (US)

(73) Assignee: Gleason Cutting Tools Corporation, Loves Park, IL (US)

( * ) Notice: Subject to any disclaimer, the term of this patent is extended or adjusted under 35 U.S.C. 154(b) by 0 days.

(21) Appl. No.: 11/998,071

(22) Filed: Nov. 28, 2007

(65) Prior Publication Data

US 2008/0145164 A1 Jun. 19, 2008

Related U.S. Application Data

(60) Provisional application No. 60/874,857, filed on Dec. 14, 2006.

(51) Int. Cl.
*B23Q 3/157* (2006.01)
*B23Q 11/10* (2006.01)

(52) U.S. Cl. ............... 483/9; 483/32; 483/33; 409/136; 409/230; 408/61; 408/128; 451/178

(58) Field of Classification Search ........... 483/13, 483/8–10, 30, 31–33; 409/135–136, 144, 409/230; 451/178, 259; 408/61, 124, 128, 408/238

See application file for complete search history.

(56) References Cited

U.S. PATENT DOCUMENTS

| | | | | |
|---|---|---|---|---|
| 4,981,403 A | * | 1/1991 | Katayama | 409/136 |
| 5,322,494 A | * | 6/1994 | Holtey et al. | 483/12 |
| 5,697,739 A | * | 12/1997 | Lewis et al. | 409/230 |
| 5,823,722 A | * | 10/1998 | Takenaka | 409/230 |
| 6,122,808 A | | 9/2000 | Popp | |
| 6,474,914 B1 | * | 11/2002 | Lang | 409/144 |
| 6,729,813 B2 | * | 5/2004 | Sahm et al. | 409/136 |
| 7,311,482 B2 | * | 12/2007 | Sugita et al. | 409/231 |
| 2004/0012359 A1 | * | 1/2004 | Katoh et al. | 318/560 |
| 2004/0074074 A1 | * | 4/2004 | Kikkawa et al. | 29/402.08 |
| 2007/0110533 A1 | * | 5/2007 | Geissler et al. | 409/231 |

FOREIGN PATENT DOCUMENTS

| | | | |
|---|---|---|---|
| DE | 10027750 A1 | * | 12/2001 |
| DE | 202005010331 | | 12/2005 |
| EP | 1172175 | | 1/2002 |
| EP | 1182006 | | 2/2002 |
| JP | 3-142144 | | 6/1991 |

OTHER PUBLICATIONS

Extended European Search Report (EESR) for EP 07023178.2.

* cited by examiner

*Primary Examiner*—Erica E Cadugan
(74) *Attorney, Agent, or Firm*—Robert L. McDowell

(57) ABSTRACT

An exchangeable spindle assembly for a machine tool. The spindle assembly includes an assembly attachment coupling being connectable to said machine tool, a tool spindle having a predetermined spindle diameter, and a spindle drive coupling being connectable with a drive mechanism of the machine tool. The drive coupling communicates with the tool spindle whereby rotation of the drive coupling effects rotation of the tool spindle. The spindle assembly further includes at least one coolant distribution manifold being connectable with a coolant supply source on the machine tool via a coolant connection on the spindle assembly. The spindle assembly being arranged in a manner whereby upon mounting the spindle assembly on the machine tool, the assembly attachment coupling, spindle drive coupling and coolant connection are all concurrently connectable to the machine tool. Additional connections may be included.

16 Claims, 4 Drawing Sheets

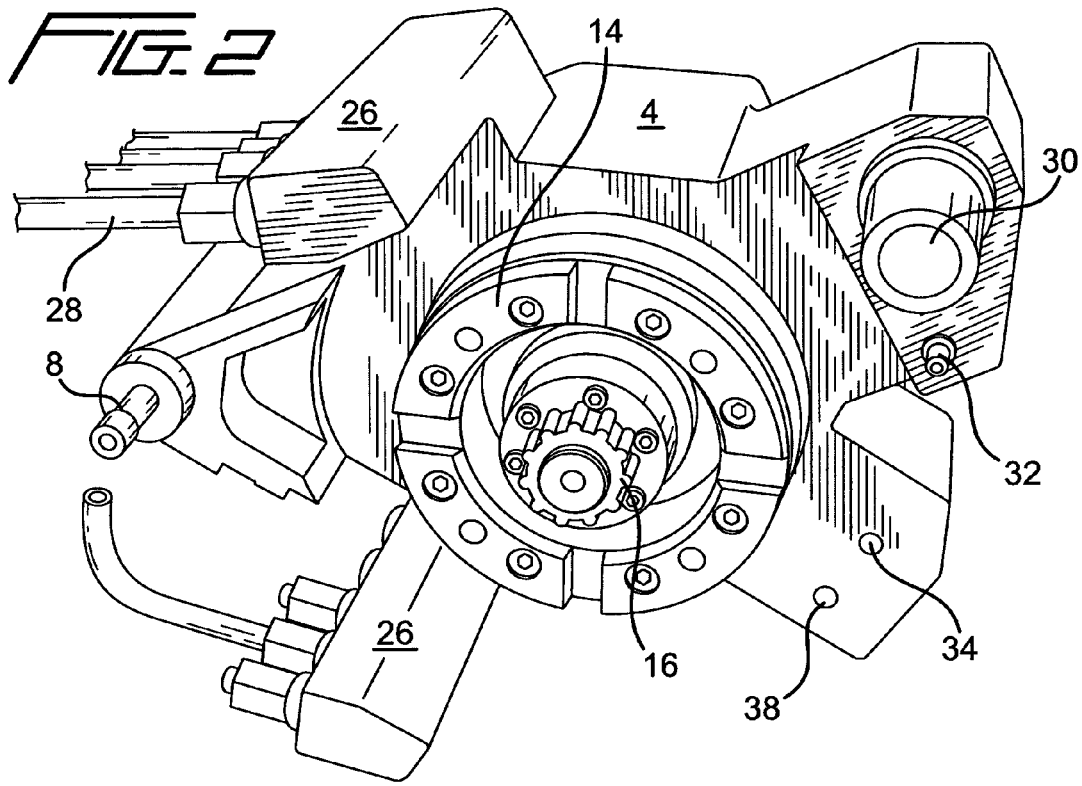
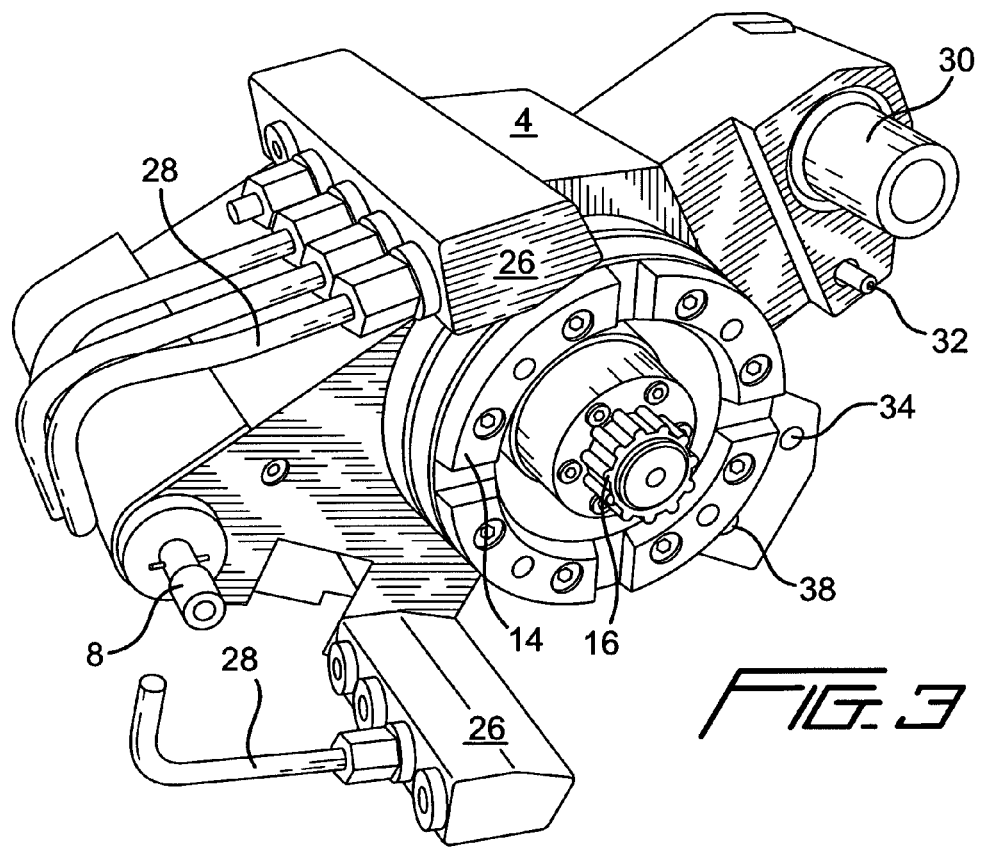

MACHINE SPINDLE

The application claims the benefit of U.S. Provisional Patent Application No. 60/874,857 filed Dec. 14, 2006, the entire disclosure of which is hereby incorporated by reference.

FIELD OF THE INVENTION

The present invention is directed to machine tools, such as tool grinding machines, and more particularly to exchangeable spindles for such machines.

BACKGROUND OF THE INVENTION

In the sharpening of cutting tools, such as milling cutters or gear hobs, the size and geometry of the tool are factors that influence the diameter of the grinding wheel best suited for tooth profile grinding. As the number of gashes (flutes) increases and/or the diameter of the hob or milling cutter gets smaller, the indexing space from tooth to tooth along a helical thread lead or non-helical circumferential path gets smaller thereby requiring a smaller grinding wheel to radially relieve a tooth profile to its designed length and not interfere with the tip of the next tooth along the grinding path.

Tooth profile depth also dictates the minimum diameter wheel that can be used so that the trued/dressed minimum root diameter of the wheel is always greater than the outside diameter of the grinding spindle when the spindle is parallel to the axis of the workpiece being ground.

In most cases, as the need arises for grinding wheels having different outside diameters (in order to maximize metal removal rates without introducing tooth to tooth interference), so does the need to provide a grinding spindle of appropriate size so as to maximize the stiffness of the spindle. However, on conventional grinding machines, exchanging the grinding spindle is an arduous and time consuming task. On account of this, many tool manufacturing facilities employ a plurality of grinding machines of varying spindle and grinding wheel sizes. On the other hand, in an effort to minimize the expense of multiple machines, some profile grinding processes are compromised by utilizing inadequately sized grinding spindles for certain grinding wheel diameters.

SUMMARY OF THE INVENTION

The present invention is directed to an exchangeable spindle assembly for a machine tool. The spindle assembly includes an assembly attachment coupling being connectable to the machine tool, a tool spindle having a predetermined spindle diameter, and a spindle drive coupling being connectable with a drive mechanism of the machine tool. The drive coupling communicates with the tool spindle whereby rotation of the drive coupling effects rotation of the tool spindle. The spindle assembly further includes at least one coolant distribution manifold being connectable with a coolant supply source on the machine tool via a coolant connection on the spindle assembly. The spindle assembly is arranged in a manner whereby upon mounting the spindle assembly on the machine tool, the assembly attachment coupling, spindle drive coupling and coolant connection are all concurrently connectable to the machine tool. Additional connections may be included.

BRIEF DESCRIPTION OF THE DRAWINGS

FIG. 2 is a front view of the inventive spindle assembly.

FIG. 3 illustrates an alternative front view of the spindle assembly.

DETAILED DESCRIPTION OF THE PREFERRED EMBODIMENT

The details of the preferred embodiments will be discussed with reference to the accompanying drawings which represent the invention by way of example only.

Figure 1:
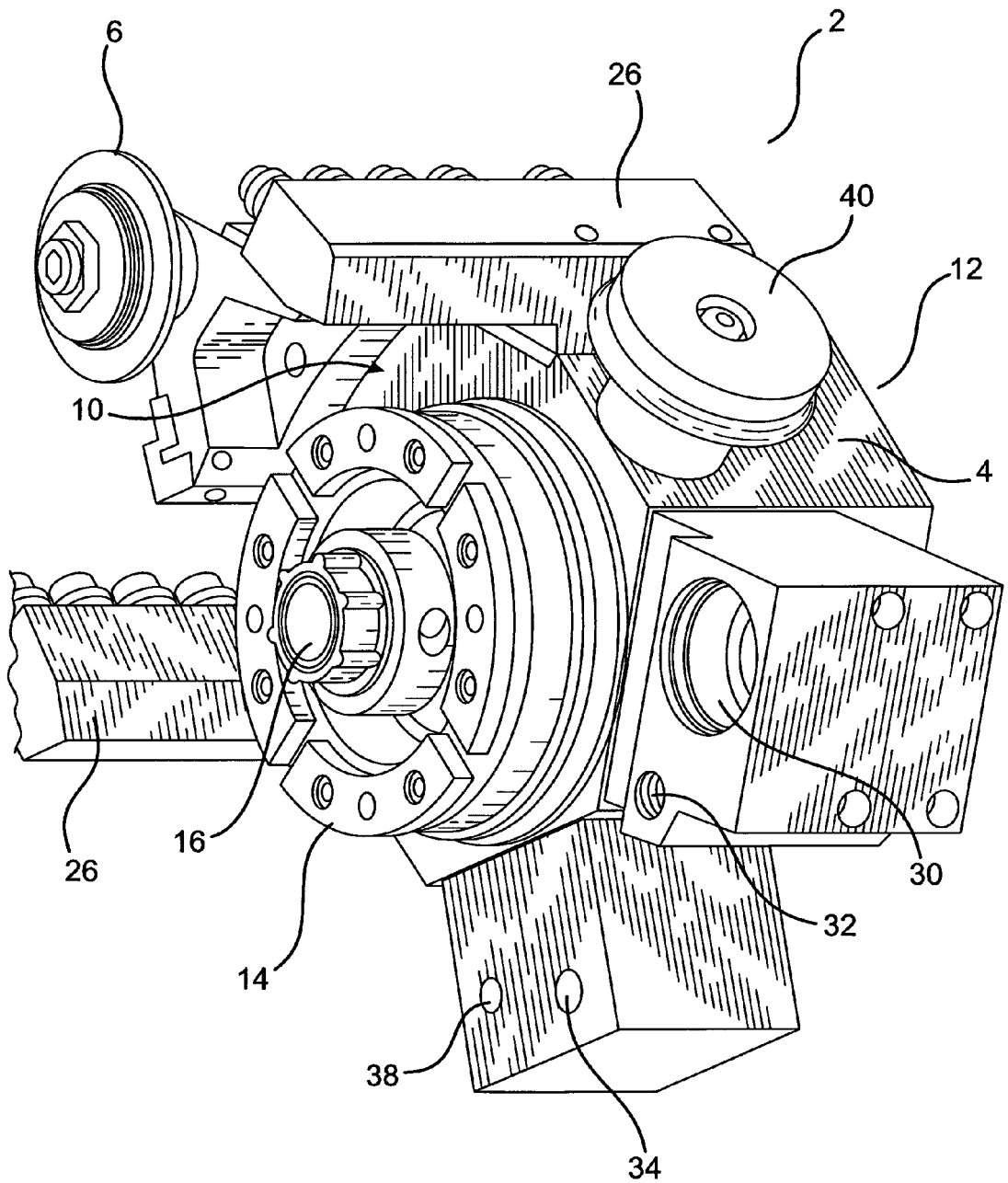
FIG. 1 illustrates an elevated view of the inventive spindle assembly.
Figure 5:
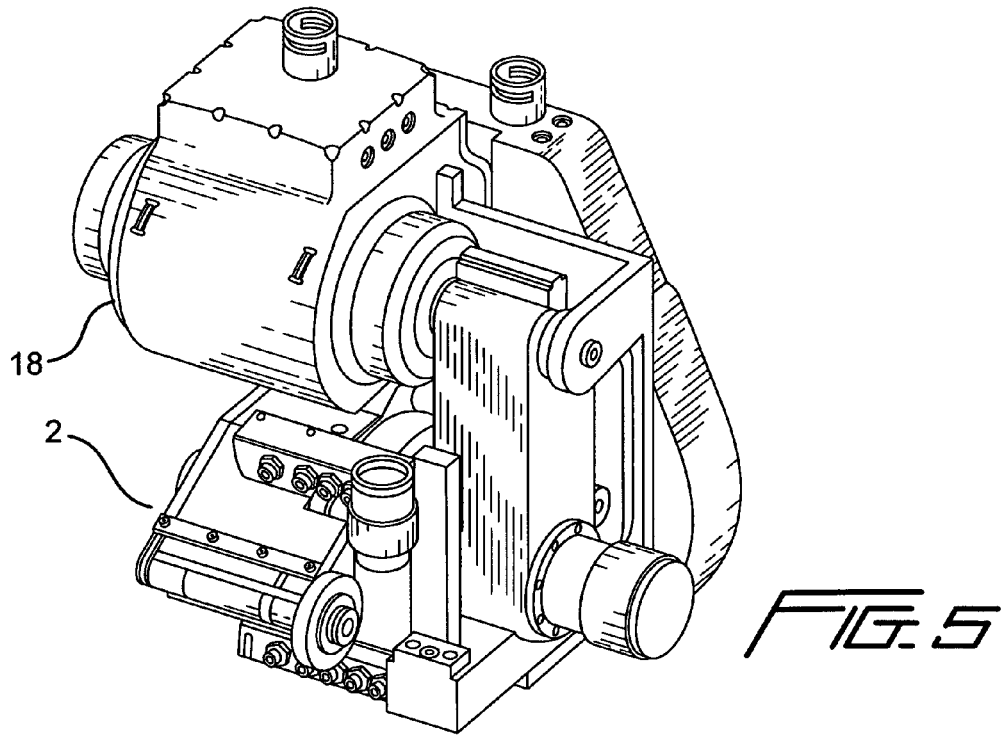
FIG. 5 is an enlarged view of the spindle assembly in its operative position in a machine.
Figure 6:
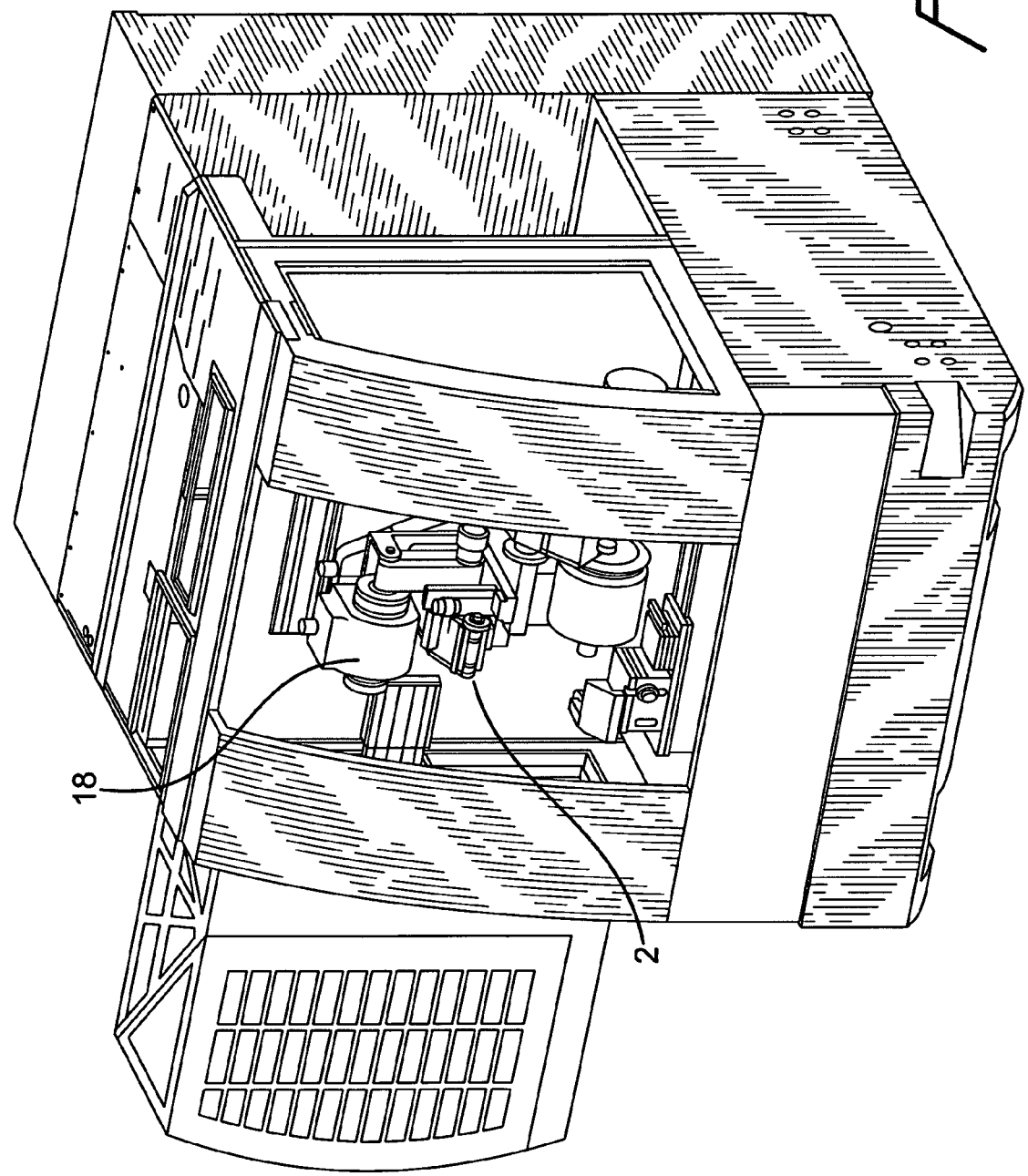
FIG. 6 illustrates the spindle assembly operatively positioned within a machine tool.

FIGS. 1-3 show the inventive spindle assembly 2 having a housing 4, tool 6 (grinding wheel shown) and tool spindle 8 (FIGS. 2, 3). The spindle assembly has a first end, generally shown at 10, and a second end generally shown at 12. The spindle assembly 2 includes an attachment coupling 14 (such as a die plate coupling manufactured by EROWA) for releasably securing the spindle assembly in position on a machine tool (FIGS. 5 or 6) such as, for example, a grinding machine for grinding cutting tools, in particular gear cutting tools such as hobs and milling cutters.

Figure 4:
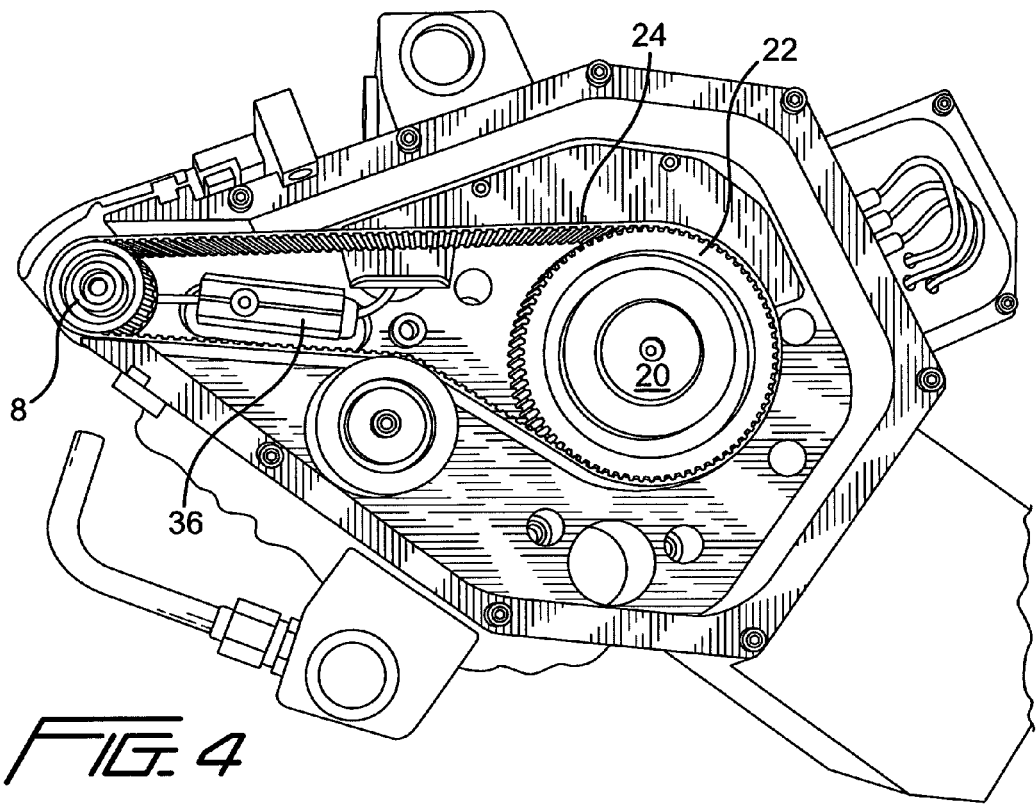
FIG. 4 is a back view of the inventive spindle assembly with cover removed.

The spindle assembly 2 further comprises a drive coupling 16 (for example, manufactured by R. W. Couplings) for connection with an appropriately formed mating drive coupling (not shown) on the machine tool for providing drive torque from a tool drive motor 18 (FIG. 5) on the machine tool to the tool 6. Drive coupling 16 may be connected to tool spindle 8 via any suitable means with a preferred manner (FIG. 4, with cover removed) being via a shaft 20 extending toward second end 12 from the drive coupling 16, gear 22, and toothed belt 24 connected to the non-tool end of spindle 8. Toothed belt 24 is preferably located proximate the second end 12 of the spindle assembly 2.

The spindle assembly further includes one or more (preferably two) coolant distribution manifolds 26 with each manifold having one or more coolant nozzles 28 connected thereto. Nozzles 28 may be of any number and shape so as to direct coolant to the appropriate locations on a particular tool and/or workpiece. The coolant distribution manifolds 26 are in fluid communication with a coolant supply connection 30 (e.g. manufactured by Staeubli) located at the first end 10 of the spindle assembly. Upon placement of spindle assembly 2 in a machine, coolant supply connection 30 communicates with an appropriately configured coolant connection on the machine whereby coolant can be supplied to the nozzles 28 during machining.

The attachment coupling 14, drive coupling 16 and coolant supply connection 30 are all positioned such that upon mounting the spindle assembly 2 in a machine, the couplings 14, 16 and the coolant supply connection 30 all connect concurrently with the machine. In this manner, inserting or removing the spindle assembly can be accomplished easily and quickly.

Spindle assembly 2 preferably also includes a connection 32 (e.g. manufactured by Staeubli) for supplying a lubricant (e.g. air, oil, mist) originating from the machine for bearings in the spindle 8. As with the connections discussed above, the lubricant connection 32 is preferably positioned whereby upon mounting the spindle assembly 2 in a machine, all connections are made concurrently with the machine.

Spindle assembly 2 also preferably comprises an electrical connection 34 for a sensor, preferably a proximity sensor 36 (FIG. 4), for detecting the speed or motion of spindle 8. The electrical connection 34 connects with a mating connection in the machine whereby signals from the sensor 36 are transmitted to a computer control on the machine. Again, as with the connections discussed above, the electrical connection 34 is preferably positioned whereby upon mounting the spindle assembly 2 in a machine, all connections are made concurrently with the machine. Alternatively, the spindle assembly may include a transmitter that sends detected signals and/or information from the sensor to the computer control via a wireless transmission.

The spindle assembly 2 may also be provided with a means 38 to transfer tool and/or process information to the machine computer control. Preferably, information such as machine setup parameters, rough dressed profile information, offsets and drive ratio particular to the specific workpiece and tool are automatically transferred to the machine upon mounting the spindle assembly 2 on the machine. A preferred manner of such automatic transfer is to store the appropriate information on a transfer chip wherein the information is read by the machine upon bringing the transfer chip in close proximity to a reading head on the machine. Such information transfer systems are known with an example being the Balluff Chip Information System. In the present invention, the information transfer means 38 is preferably located at the first end 10 of the spindle assembly 2 so that upon mounting of the spindle assembly on a machine, information will be transferred concurrently with the connections of other systems as discussed above.

The inventive spindle assembly 2 is easily and rapidly mounted to a machine as the spindle assembly is effectively "plugged-in" to the machine in order to establish all connections of all spindle assembly service functions, discussed above, between the machine and the spindle assembly. The inventive assembly provides the opportunity for the utilization of a single machine with a plurality of identical spindle assemblies (i.e. identically arranged couplings and connections) whereby the assemblies can be easily and rapidly exchanged on the machine. Such exchange may be done for many reasons among them being providing spindles of different diameters (e.g. 15 mm, 30 mm, 45 mm) as appropriate for particular grinding wheel diameters, workpiece sizes or workpiece geometries.

Spindle assemblies having differently configured coolant nozzles may be exchanged as dictated by a particular job or coolant nozzles can be reconfigured off the machine while the machine is operating with another spindle assembly. Identical spindle assemblies may be utilized whereby while one spindle assembly is operating on a machine, such as a grinding machine, another identical assembly may be placed on a dressing machine for dressing a grinding wheel. At the appropriate point of grinding wheel wear on the grinding machine, the identical spindle assemblies can be exchanged in a short period of time and grinding can then commence again. At the same time, the just-removed spindle assembly can be placed on the dressing machine to restore its grinding wheel to an operative geometry.

The spindle assembly 2 can be manually loaded into a machine tool or, preferably, automatic loading and unloading may be utilized. A carousel loader and linear slide assembly, or a robot may move the spindle assembly in and out of a machine. Spindle assemblies may be moved between two or more machines (e.g. between grinding machine and dressing machine) via a pivotable lifting mechanism, automated transfer line or robot. The spindle assembly 2 may include a load/unload adapter 40 to facilitate loading and unloading equipment with gripping the spindle assembly.

The skilled artisan will recognize that in order for the inventive spindle assembly 2 to operatively engage a machine tool, said machine tool must be configured with service function connections that will align with and connect to the couplings and connections of the spindle assembly. Such machine service functions connections may be designed as an integral part of a new machine. Existing machines may require modification to provide proper alignment and connections of service functions. In the event that all connections of a spindle assembly are not needed for a particular application, the respective machine should still accommodate such unnecessary connections in a manner appropriate to allow proper mounting of the spindle assembly on the machine. For example, machine connections may be provided even though no respective service supply line communicates with such connection. Alternatively, a cavity formed in a machine surface may serve to accommodate an unused connection on the spindle assembly.

Although the present invention has been discussed with reference to grinding methods and tools (e.g. grinding wheels), the inventive spindle assemblies are not limited to grinding applications but are also applicable to cutting machines and tools.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An exchangeable spindle assembly for a machine tool, said assembly comprising:
    a first end and a second end;
    an assembly attachment coupling being connectable to said machine tool;
    a tool spindle having a predetermined spindle diameter and having a connection for supporting a grinding wheel or cutting tool,
    a spindle drive coupling being selectively connectable to a drive mechanism of said machine tool, said drive coupling being in communication with said tool spindle whereby rotation of said drive coupling effects rotation of said tool spindle about an axis;
    wherein said first end and second end are axially spaced in the direction of the tool spindle axis, and wherein said connection and said spindle drive coupling are located on said first end of said assembly;
    at least one coolant distribution manifold, said manifold being connectable with a coolant supply source on said machine tool via a coolant connection on said assembly;
    whereby upon mounting said spindle assembly on said machine tool, said assembly attachment coupling, said spindle drive coupling and said coolant connection are concurrently connectable to said machine tool.

2. The spindle assembly of claim 1 wherein said assembly attachment coupling, said spindle drive coupling and said coolant connection are located on the first end of said assembly.

3. The spindle assembly of claim 1 further including means to lubricate said spindle, the lubricating means being connectable with a lubricant supply source on said machine tool via a lubricant connection on said assembly, whereby upon mounting said spindle assembly on said machine tool, said lubricant connection along with said assembly attachment coupling, said spindle drive coupling and said coolant connection are concurrently connectable to said machine tool.

4. The spindle assembly of claim 3 wherein said lubricant connection is located on the first end of said assembly.

5. The spindle assembly of claim 1 further including means to detect at least one of motion and rotational speed of said tool spindle, said means to detect being electrically connectable to said machine tool via an electrical connection on said assembly, whereby upon mounting said spindle assembly on said machine tool, said electrical connection along with said assembly attachment coupling, said spindle drive coupling and said coolant connection are concurrently connectable to said machine tool.

6. The spindle assembly of claim 5 wherein said electrical connection is located on the first end of said assembly.

7. The spindle assembly of claim 1 wherein said assembly further includes a tool and process information storage means, the information in said storage means being transferable to said machine tool upon positioning said storage means proximate an information receptor on said machine tool.

8. The spindle assembly of claim 7 wherein said information storage means is located on the first end of said assembly.

9. The spindle assembly of claim 7 wherein said information storage means comprises a transfer chip.

10. The spindle assembly of claim 1 wherein a grinding wheel is positioned on said tool spindle.

11. The spindle assembly of claim 1 wherein a cutting tool is positioned on said tool spindle.

12. The spindle assembly of claim 1 being capable of engaging a machine tool whereby said assembly attachment coupling, said spindle drive coupling and said coolant connection align with and concurrently connect to mating connections on said machine tool.

13. The spindle assembly of claim 1 wherein said spindle drive coupling is connected to said tool spindle via a shaft, a gear and a toothed belt.

14. The spindle assembly of claim 13 wherein said toothed belt is located at said second end of said spindle assembly.

15. The spindle assembly of claim 1 further including a load and/or unload adapter for engagement with a gripping means located on a load and/or unload apparatus.

16. The spindle assembly of claim 1 further including means to detect at least one of motion and rotational speed of said tool spindle and provide a representative signal thereof, wherein said representative signal is conveyed to said machine tool via a wireless connection.

* * * * *